(12) United States Patent
Mori

(10) Patent No.: US 6,354,651 B1
(45) Date of Patent: Mar. 12, 2002

(54) CABLE ARRANGEMENT FOR A DOOR WIRE HARNESS AND A GROMMET THEREOF

(75) Inventor: Keisuke Mori, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/540,981

(22) Filed: Mar. 31, 2000

(30) Foreign Application Priority Data

Apr. 2, 1999 (JP) .......................................... 11-096401

(51) Int. Cl.$^7$ ................................................. B60J 3/00
(52) U.S. Cl. ................. 296/146.1; 296/152; 296/146.9; 296/208; 296/146.5; 49/502; 174/152 G; 174/153 G
(58) Field of Search .............................. 296/152, 146.1, 296/146.7, 146.9, 208, 146.5; 174/72 A, 152 G, 153 G, 65 G; 49/502, 167; 307/10.1

(56) References Cited

U.S. PATENT DOCUMENTS

| | | | |
|---|---|---|---|
| 4,862,011 A | * 8/1989 | Wright | ....................... 307/10.1 |
| 5,092,647 A | * 3/1992 | Ueda et al. | ............. 296/208 X |
| 5,270,487 A | 12/1993 | Sawamura | |
| 5,405,672 A | 4/1995 | Takiguchi et al. | |
| 5,448,017 A | 9/1995 | Nakajima et al. | |
| 5,584,144 A | * 12/1996 | Hisano | ......................... 49/502 |
| 5,588,260 A | * 12/1996 | Suzuki et al. | ................. 49/502 |
| 5,716,044 A | * 2/1998 | Peterson et al. | ............. 296/152 |
| 6,079,764 A | * 6/2000 | Suzuki et al. | ............. 296/146.1 |

FOREIGN PATENT DOCUMENTS

| | | |
|---|---|---|
| DE | 3500359 | 2/1986 |
| DE | 19714630 | 10/1997 |
| EP | 0888930 | 1/1998 |
| EP | 0882922 | 12/1998 |
| JP | 7-179156 | 7/1995 |
| JP | 8-40155 | 2/1996 |
| JP | 9-48241 | 2/1997 |

OTHER PUBLICATIONS

English Language Abstract of JP 8–40155.
English Language Abstract of JP 9–48241.

* cited by examiner

Primary Examiner—Joseph D. Pape
(74) Attorney, Agent, or Firm—Greenblum & Bernstein, P.L.C.

(57) ABSTRACT

The present invention relates to a door wire harness capable of passing through the inside of a door frame without being splashed with water. A door harness is provided from a body side of a vehicle over a door side and reaches to the inside area of a door frame by passing through a first penetration hole provided in the body of the vehicle to a second penetration hole provided in a side panel area of a hinge installation area of the door frame, is pulled out between the door frame and trim cover by passing through a third penetration hole provided in the inner panel area of the door frame. The area of the door harness that extends from the first penetration hole over to the third penetration hole is passed through the inside of consecutive grommets, and joint areas provided in the grommets are connected with the first penetration hole, second penetration hole, and third penetration hole, respectively.

20 Claims, 4 Drawing Sheets

PRIOR ART

PRIOR ART

CABLE ARRANGEMENT FOR A DOOR WIRE HARNESS AND A GROMMET THEREOF

BACKGROUND OF THE INVENTION

1. Field of the Invention

The present invention relates to a cable arrangement structure of the door wire harness of a vehicle and a grommet used for cable arrangement.

2. Description of Background Information

Since the inside of a door frame of a vehicle becomes soaked in water which is transmitted past a glass, a door wire also gets soaked when the door harness is provided in the inside of the door frame. The sub-stream of the soaked door harness passes through an opening provided in the inner panel area of the door frame, and is further passed through a hole in a sealing screen between the inner panel area of the door frame and a trim cover, in order to connect to electrical equipment, such as a power window switch, etc., which is installed in the trim cover. Accordingly, the aforementioned electrical equipment is exposed to water splashing, between the sealing screen and the trim cover, due to soakage through the door harness. Accordingly, as FIG. 6 illustrates, the door harness W/H is conventionally provided to the downward direction in the inside area of the door frame to release the water, and then, is passed through a penetration hole 1a in the inner panel area 1 and the opening in the sealing screen to be connected to the connector which is provided in a trim cover.

In the aforementioned structure, the door harness must be redundantly lengthened to get the door harness detoured to the downward direction, and also external equipment for protecting the detoured door harness to the downward direction is required. Moreover, even if a door harness is detoured in the downward direction, an operation for penetrating a hole in a sealing screen is necessary, which causes a problem as to the time required for the operation.

In order to solve the aforementioned problems, proposed solutions are conventionally presented in Japanese Unexamined Patent Publication No. (Hei)179156/1995, Japanese Unexamined Patent Publication No. (Hei)48241/1997, and Japanese Unexamined Publication No. (Hei)40155/1996 etc. In any of these solutions, as briefly shown in FIG. 7, a depression 3 having an L-shape is formed extending from the side panel area 2a of a hinge installation area over to the inner panel area 2b of the door frame 2, and an installation unit 4 covering the depression 3 is provided. The installation unit 4 is made up of an L-shaped steel plate 5, or a resin plate, provided with a harness penetration hole 5a and a rubber material 6, used for contacting the wire harness, is installed on the inside of the plate. A grommet 7 having the door harness W/H internally inserted in the penetration hole is installed, and the door harness W/H is pulled out from the grommet 7 at the door side and is provided in the external surface of the inner panel area of the door frame by precisely adjusting the internal surface of the installation unit 4, in order not to pass through the inside of the door frame which gets soaked in water. In this construction, the installation unit 4 passes through a weather strip 8 which is vertically installed in the side panel area 2a of a hinge installation area, since the installation unit 4 extends to the inside panel area of the door.

In the aforementioned structure, the appearance may be damaged because the installation unit 4, which is installed extends from the side panel area 2a over the inner panel area 2b of the door, can be seen. Since the installation unit 4 passes through the weather strip 8, a gap caused by floating the position of the weather strip 8 can easily occur, and accordingly, water seepage through the gap into the inside of a vehicle is a possibility. Moreover, when the installation unit 4 is introduced, assembly costs increase due to the increase in the number of areas used. Also, together with greater time required for installing the installation unit 4 in the door harness W/H, even if the construction provides for installing the installation unit 4 in the door frame with a clamping bolt 9, the operation performance will greatly deteriorate because an operator has to bring bolts and clamping tools with him while conducting the installation.

The present invention does not have the aforementioned problem that results from a depression provided extending from a side panel area toward an inner panel area of a door frame that is closed with an installation unit. However, by the construction of the present invention is such that a door harness pulled out to the external surface of the inner panel area is prevented from water splashing so that the conventional installation unit having a complicated structure is not required, and also prevents interference with a weather strip, and the main purposes are to reduce costs and decrease the number of operations, together with the improvement of appearance and waterproofing.

SUMMARY OF THE INVENTION

In order to solve the aforementioned problems, the present invention presents a cable arrangement for a door wire harness, including a door harness provided from a body side of a vehicle over a door side and reaching to an inside area of a door frame by passing through a first penetration hole provided in a body of the vehicle to a second penetration hole provided in a side panel area of a hinge installation area of the door frame. The harness is pulled out between the door frame and a trim cover by passing through a third penetration hole provided in an inner panel area of the door frame. The area of the door harness extends from the first penetration hole to the third penetration hole and is passed through the inside of consecutive grommets. Joint areas provided in the grommets are connected with the first penetration hole, the second penetration hole, and the third penetration hole, respectively.

As mentioned above, the door wire harness extends from a body side of the vehicle to the door side, where the door harness passes through the second penetration hole provided in a side panel area of the door frame to the inside of the door frame, and is pulled out from the third penetration hole provided in an inner panel area. The harness passes through the inside of consecutive grommets extending from the first penetration hole provided in the body of the vehicle to the third penetration hole provided in the inner panel area of the door frame. Thus, water soakage occurring between the door frame and a trim cover through which the door harness is pulled out from the inner panel area of the door frame can be prevented because the door harness is not exposed to water splashing.

Also, in the aforementioned construction, only one grommet is required together with the provision of penetration holes in just the side panel area and the inner panel area of the door frame. Accordingly, cost reduction will be attained by decreasing the number of areas and operations since an installation unit for closing the L-shaped depression, which is conventionally provided to extend from the side panel area to the inner panel area of a hinge installation side is not required. In addition, the aforementioned structure can be commonly provided for both left and right doors, and, together with the improvement of appearance, can prevent water soakage through a weather strip because the weather strip is not penetrated by this construction.

The diameter of the first penetration hole provided in the body of the vehicle is smaller than the diameter of the second penetration hole provided in the hinge installation area of the door frame, and the diameter of the second penetration hole is smaller than the diameter of the third penetration hole provided in the inside of the door frame. With these settings of the individual diameters, a grommet insertion operation can be easily conducted for installation of the grommet, having a door harness pass through, to the door frame and a body of a vehicle because the insertion operation starts at the third penetration hole, proceeds to the second penetration hole, and then to the first penetration hole.

Also, it is preferable that the height of the position of the first penetration hole provided in a body of a vehicle is higher than the height of the position of the second penetration hole provided in the end of a hinge installation area of the door frame, and the height of the position of the second penetration hole is lower than the height of the position of the third penetration hole provided in the inside of the door frame. With the height of the position of the second penetration hole being lower in this way, the center position is lower than the grommet on both sides of the door frame, and the water which contacts the grommet inside the door frame and also between the door frame and a body of a vehicle can be easily released.

Moreover, it is preferable that a guide panel provided in the door frame extend toward the third penetration hole from the second penetration hole, and toward the second penetration hole at the third penetration hole from the periphery of the second penetration hole and/or the third penetration hole. Namely, since the insertion operation between the third penetration hole and the second penetration hole can not be seen, it must be easy to pass the grommet through the second penetration hole by using the guide panel provided as described above.

It is also preferable that the area which is provided with the third penetration hole is inclined toward the second penetration hole, and that the area is depressed toward the internal side of the door frame. With this construction, the insertion operation of the grommet, with the third penetration hole being passed through, naturally turns in the direction of the second penetration hole.

The present invention also provides a grommet used for a cable arrangement of the aforementioned door harness. The grommet is configured to have three joint areas which are consecutively connected with a small diameter tube for wire harness penetration between every other joint area. In particular, a first large diameter area is consecutively provided with small diameter cylinder at one end which is securable by tape-winding to the door harness, and the first joint area to be connected to the periphery of the first penetration hole is provided in the perimeter of the first large diameter area. A small diameter cylindrical bellows is connected to one end of the first large diameter area, and a second large diameter area is provided at the other end of the cylindrical bellows. The second joint area to be connected to the periphery of the second penetration hole is provided in the perimeter of a second large diameter area. One of a consecutive small diameter cylindrical bellows and an L-shaped tube is connected to the second large diameter area. A third large diameter area is provided at one end of the tube or bellows, and the third joint area to be connected to the periphery of the third penetration hole is provided in the perimeter of the third large diameter area.

In this construction of the aforementioned grommet, the three joint areas making up the grommet are consecutively connected with the two small diameter tubes used for the wire harness penetration. Even if the two small diameter tubes are replaced with cylindrical bellows, bending and deforming can easily be obtained, and accordingly, the operation for connecting to the three penetration holes can be performed smoothly. Moreover, since one end of a cylindrical bellows is place outside between a body of a vehicle and a door frame, a flexible door opening and/or closing function can be retained, and the deformation between the third penetration hole to the second penetration hole can be accomplished because the other end of the cylindrical bellows is placed in the inside of the door frame. Also, it is possible that the cylindrical bellows used as a small diameter tube which is passed through the inside of a door frame can be replaced with an L-shaped tube with a fixed position relative to the door frame, in order to prevent interference with the glass rail of a door.

The aforementioned grommet can be formed in a straight shape during molding. Accordingly, manufacturing cost increases can be prevented.

In the aforementioned grommet, a resin inner member may be installed in the joint area. In case of the installation of the resin inner member, operational performance can be improved. However, the resin inner member installation is not always required because manufacturing and assembly costs will be increased.

According to another aspect of the present invention, a cable arrangement for a door wire harness of a vehicle is provided, and the vehicle includes a body with a door. The cable arrangement includes a first aperture in a portion of the body adjacent a frame of the door, a second aperture in a side panel of a frame of the door, a third aperture in an inner panel of the door, and an elongated grommet having spaced apart first, second, and third joint areas sized to fit securely in a respective one of the first, second and third apertures to provide a waterproof connection.

Additionally, the first, second, and third apertures and the first, second and third joint areas are configured such that the first aperture and the first joint area are smaller than the second aperture and the second joint area, and the second aperture and the second joint area are smaller than the third aperture and the third joint area. Also, the first aperture is positioned at a height above the second aperture, and the third aperture is positioned at a height above the second aperture.

In another aspect of the present invention, the cable arrangement for a door wire harness may include a guide panel provided within the door frame, the guide panel extending from adjacent the second aperture toward the third aperture to guide insertion of the grommet between the third aperture and the second aperture during installation.

In a further aspect of the present invention, the cable arrangement for a door wire harness may include the third aperture provided within a depression in the inner panel, with the depression extending toward an interior of the door. Additionally, the depression may be inclined toward the second aperture to enable easy insertion of the grommet from the third aperture toward the second aperture.

Moreover, the cable arrangement for a door wire harness may further include an inner resin member installed in each of the first, second and third joint areas and engagable with a respective one of the first, second and third apertures to provide a secure connection between the respective joint areas and the apertures.

According to another aspect of the present invention, a grommet for a door wire harness is provided. The grommet includes a first joint area having a first size, a second joint area having a second size, and a third joint area having a third size. A first generally tubular member interconnects the first and second joint areas, and a second generally tubular member interconnects the second and third joint areas. Furthermore, the first size is smaller than the second size, and the second size is smaller than the third size, whereby the grommet is insertable in first, second, and third consecutively arrayed installation apertures having sizes corresponding to the first, second, and third sizes, respectively. Also, the first, second, and third joint areas may be configured as generally circular members, and thus, the first, second, and third sizes are first, second, and third diameters of the circular members.

In other aspects of the grommet of the present invention, at least one of the first and second tubular members is formed as a small diameter bellows, and both the first and second tubular members may be formed as small diameter bellows. Additionally, the other of the first and second tubular members may be configured as an L-shaped tubular member.

The grommet may also include an inner resin member installed in each joint area of the grommet to provide a secure connection between the respective joint areas and installation apertures. Moreover, the grommet may further include a generally tubular connecting portion connected to the first joint area on a side opposite the first tubular portion, whereby the grommet is securable to the door wire harness by taping.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several view of the drawings, and wherein.

DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
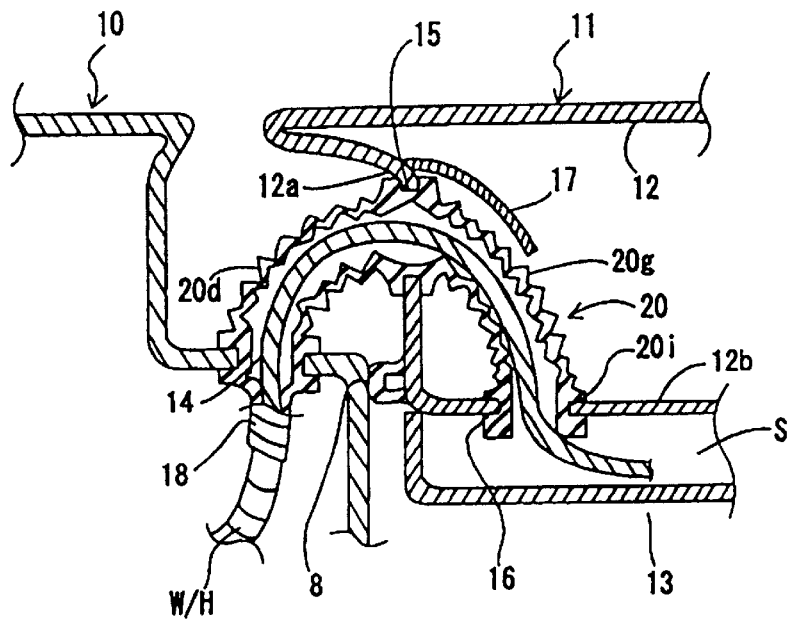
FIG. 1 is a horizontal cross sectional view showing a first embodiment of the present invention.
Figure 2:
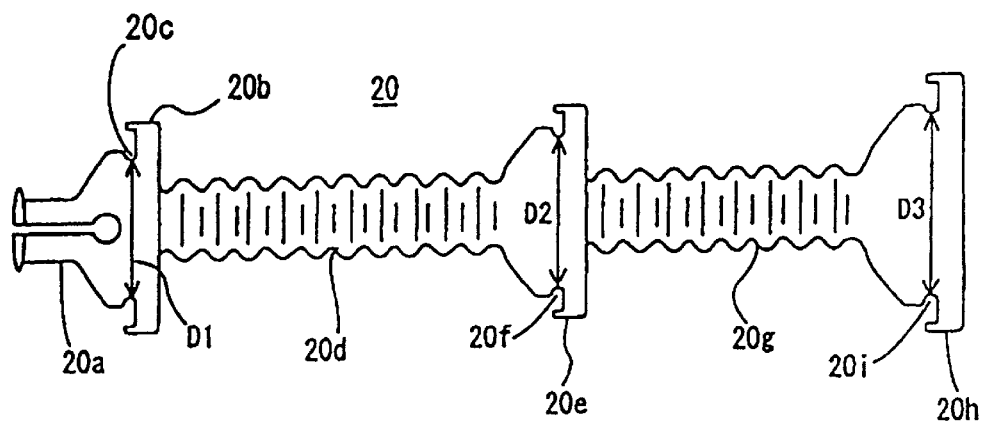
FIG. 2 is a front view of a grommet of the first embodiment of the present invention.

FIGS. 1 and 2 show the first embodiment of the present invention. In FIGS. 1 and 2, numeral 10 shows a body of a vehicle, numeral 11 shows a door, and the door 11 includes a door frame 12 and a trim cover 13 which covers the inside of the door frame 12. A door wire harness W/H is passed through a first penetration hole 14 provided in the vehicle body 10 to the door side by being pulled outside the body of a vehicle, is passed through the inside of the door frame 12 via a second penetration hole 15 provided in the side panel area 12a of the hinge installation side of the door frame 12, is passed through a third penetration hole 16 provided in the inner panel area 12b of the door frame 12, and is pulled out in space S between the inner panel area 12b of the door frame and a trim cover 13. The order of a cable arrangement for a wire harness W/H is reverse, starting with being passed into the inside of the door frame 12 through the third penetration hole 16 from the aforementioned space S, being pulled out at the door frame 12 through the second penetration hole 15, and extending toward the body 10 of the vehicle to be passed through the first penetration hole 14.

The area, ranging from the first penetration hole 14 to the third penetration hole 16, of the door harness W/H provided in a door as mentioned above is passed through the inside of the lengthened grommet 20.

The relation of the diameter of the first penetration hole 14 provided in the aforementioned body of a vehicle 10, the second penetration hole 15 provided in the side panel area of the door frame 12a and the third penetration hole 16 provided in the inner panel area of the door frame is such that the diameter of the first penetration hole 14 is less than the diameter of the second penetration hole 15 which is less than the diameter of the third penetration hole 16. Also, the relation of the height of the setting position, relative to the bottom of the door, is that the first penetration hole 14 is at a position higher than the second penetration hole 15, which is positioned lower than the third penetration hole 16, so that the second penetration hole 15 is positioned in the center, and is lower so that the grommet 20 is connected at a lower position in the center, and connected at higher positions at both ends.

Moreover, a curved guide panel area 17 is directed toward the third penetration hole 16 from the upper periphery of the second penetration hole 15, and protrudes from the back of the side panel area 12a toward the inner panel area 12b.

The aforementioned grommet 20, in which the door harness W/H is installed, is integrally formed of a natural or synthetic rubber or other elastomer and molded in a straight shape as shown in FIG. 2. The grommet 20 is made up of three joint areas, which are interconnected by consecutive cylindrical bellows. In particular, a first large diameter area 20b is provided with a small diameter cylinder area 20a, one end of which is fixed by tape-winding to the door harness W/H. A first joint area 20c formed as a peripheral recess is provided on the perimeter of the first large diameter area 20b to be connected to the periphery of the first penetration hole 14. Moreover, a small diameter cylindrical bellows 20d is connected at one end to the first large diameter area 20b, and a second large diameter area 20e is connected to the other end of a cylindrical bellows 20d. A second joint area 20f, formed as a peripheral recess, is provided on the perimeter of the second large diameter area 20e to be connected to the periphery of the second penetration hole 15. Additionally, a small diameter cylindrical bellows 20g is connected at one end to the second large diameter area 20e. A third large diameter area 20h is connected at the other end of the cylindrical bellows 20g, and a third joint area 20i, formed as a peripheral recess, is provided in the perimeter of the third large diameter area 20h to be connected to the periphery of the third penetration hole 16.

The size of the external diameters D1, D2, D3 (see FIG. 2) for the first joint area 20c, second joint area 20f, third joint area 20i, respectively, are established as D1 <D2 <D3, because the diameters of the first penetration hole 14, the second penetration hole 15, and the third penetration hole 16, which are connected to the first joint area 20c, the second joint area 20f, the third joint area 20i, respectively, are established as mentioned above.

A door harness W/H is passed through the aforementioned grommet 20 and fixed to the grommet by tape-winding at the end of the small diameter tube area 20a.

In this condition, from the side of the small diameter cylinder area 20a, the grommet 20 having a door wire harness passed therethrough is passed through the third penetration hole 16 of the inner panel area 12b of the door frame, the first joint area 20c and the second joint area 20f are passed through before the third joint area 20i is inserted into the third penetration hole 16. Next, the third joint area 20i is connected to the periphery of the third penetration hole by being pulled out from the inside of the door frame 12.

Then, after the first joint area 20c is passed through the second penetration hole 15, the joint area 20f is inserted into the second penetration hole 13, and the second joint area 20f is connected to the periphery of the second penetration hole 15 by being pulled out from the outside of the door frame. Finally, the first joint area 20c is inserted into and connected to the first penetration hole 14 by being pulled out from the outside of a body of a vehicle.

Since the grommet 20 is installed in the area of the door wire harness W/H between the first penetration hole 14 of the body of a vehicle 10 and the third penetration hole 16 of the inner panel area 12b of a door frame as mentioned above, water splashing can be completely prevented in the door harness W/H which is pulled out from the third penetration hole 16 of the inner panel area 12b of the door frame. Accordingly, water soakage by transmitting through the door harness cannot occur in the space S between the inner panel area 12b of the door frame and trim cover 13. Additionally, the door harness can be connected to electrical equipment provided in the trim cover 13. Accordingly, the conventional operation that a door harness is passed through the inner panel area of a door frame and the opening of a sealing screen is unnecessary, which leads to the improvement of the operational performance of the wire harness cable arrangement.

Figure 3:
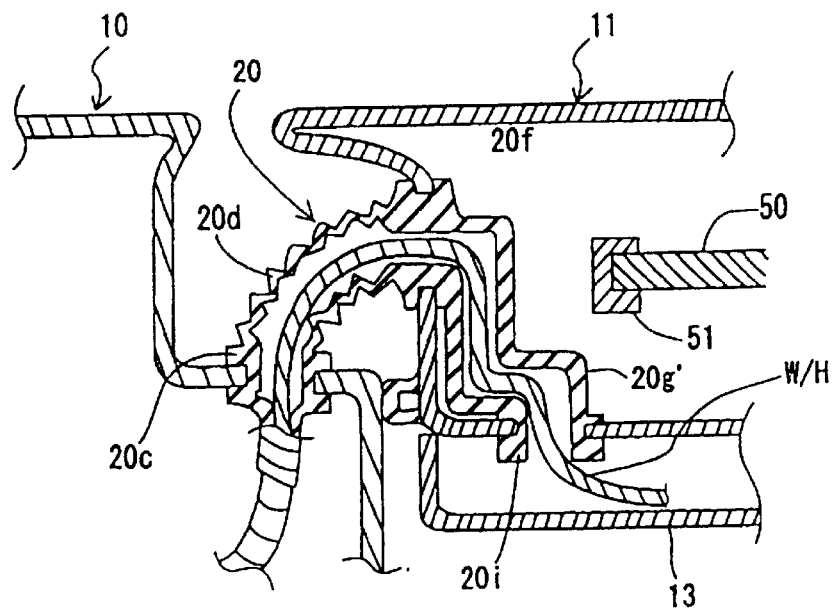
FIG. 3 is a horizontal cross sectional view showing a second embodiment of the present invention.

FIG. 3 shows the second embodiment, which differs from the first embodiment by the shape of the grommet 20. Specifically, an L-shaped tube 20g' is provided instead of the cylindrical bellows between the second joint area 20f and the third joint area 20i. When the L-shaped tube 20g' is introduced in this way and installed to align with the back side of the door frame 12, it is assured that interference with a rail 51 for a glass 50 which is provided in the inside of the door frame 12 is precluded.

Figure 4:
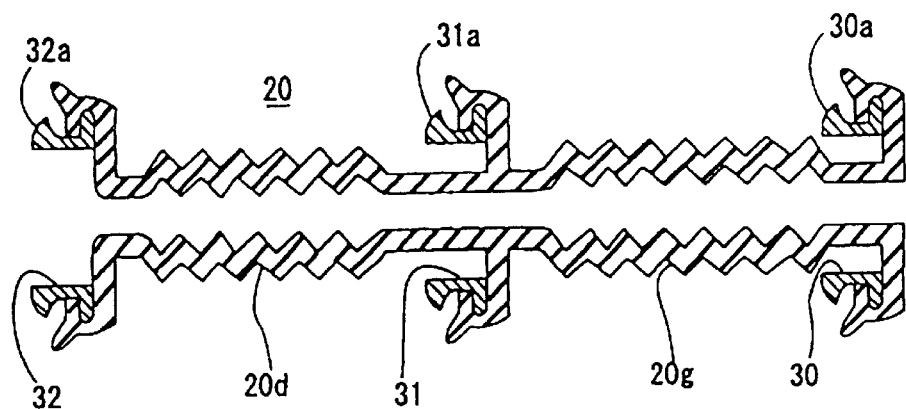
FIG. 4 is a cross sectional view showing a third embodiment of the present invention.

FIG. 4 shows the third embodiment, in which generally annular resin inner members 30, 31, 32 are installed in the first joint area, in the second joint area, and in the third joint area, respectively, of the grommet 20. With the resin inner members 30, 31, 32 being installed accordingly, the extruded joint hooks 30a, 31a, 32a of each resin inner member 30, 31, 32 can be connected, with a squeezing action to the periphery of the first, the second and the third penetration holes, which results in an efficient and secure connection of the grommet to the penetration holes.

Figure 5:
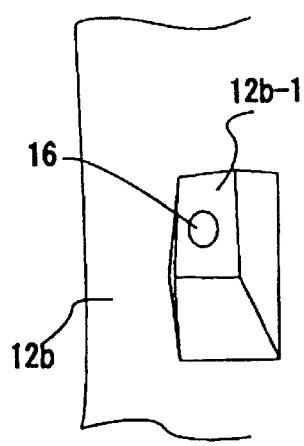
FIG. 5(A) is a partial perspective view of a fourth embodiment of the present invention.
FIG. 5(B) is a horizontal cross-sectional view of the fourth embodiment.
FIG. 5(C) is a vertical cross-sectional view of the fourth embodiment.
Figure 5:
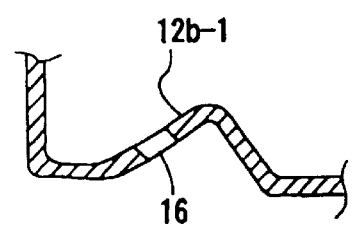
Figure 5:
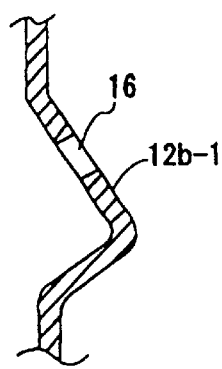
Figure 6:
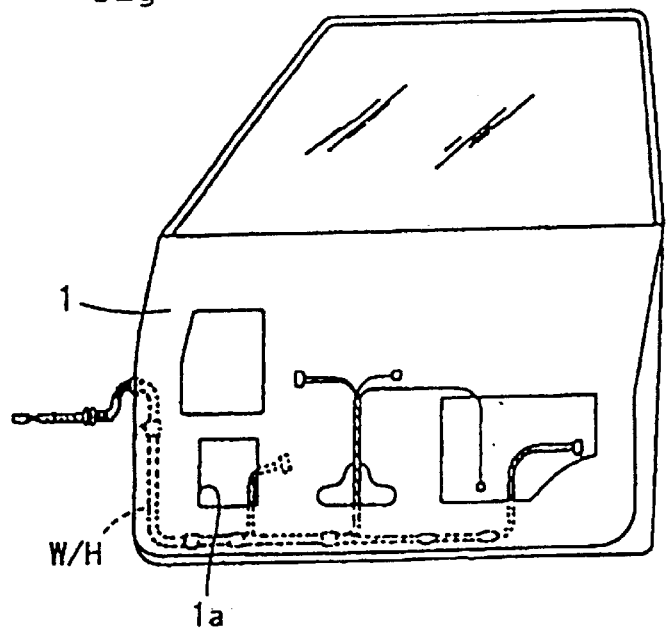
FIG. 6 is a front view of a door showing a conventional structure.
Figure 7:
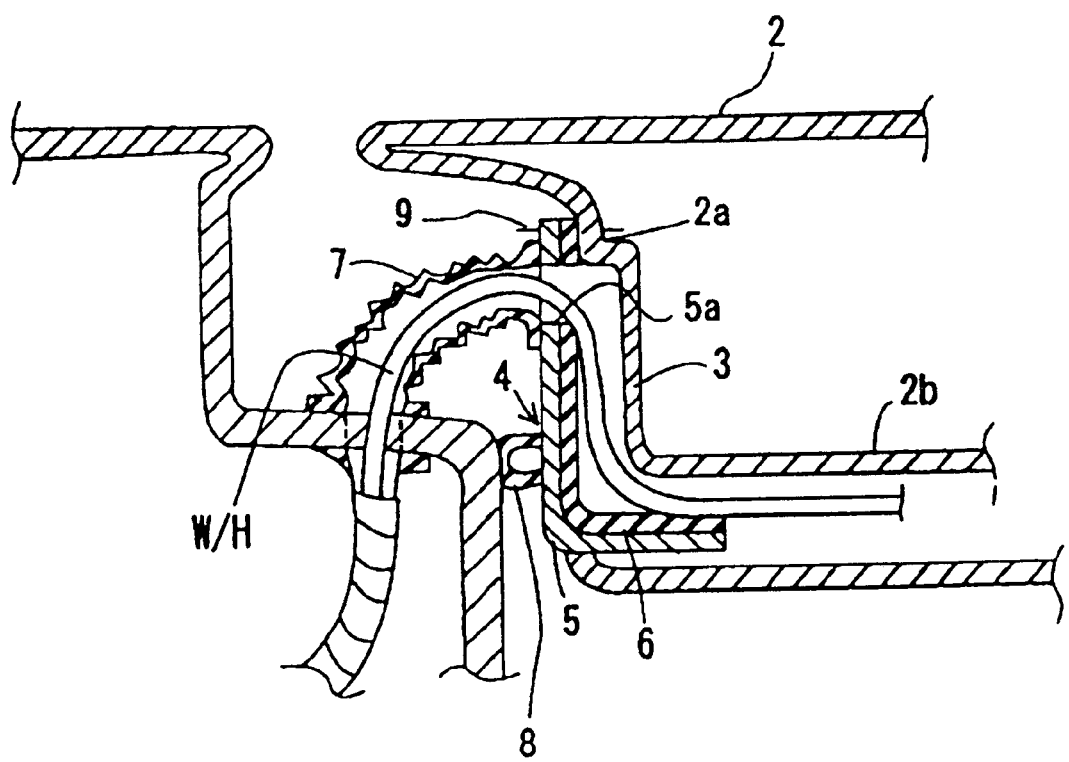
FIG. 7 is a horizontal cross-sectional view showing the construction of a conventional door harness.

FIGS. 5(A) through 5(C) show the fourth embodiment of the present invention, which differs by the shape of the inner panel area 12b of a door frame. Specifically, the area 12b-1, in which the third penetration hole 16 is provided, is depressed inwardly of the door frame. In addition, the third penetration hole 16 is provided in an area inclined toward the direction of the second penetration hole 15. Namely, the area in which the third penetration hole 16 is provided is inclined toward a side panel area 12a in the horizontal cross-sectional view shown in FIG. 5(B). Additionally, the area in which the third penetration hole 16 is provided is inclined in the downward direction in the vertical cross-sectional view shown in FIG. 5(C). With the third penetration hole 16 being turned toward the second penetration hole 15 from both the horizontal and the vertical directions, the grommet which is passed through the third penetration hole 16 naturally turns in the direction of the second penetration hole 15. Thus, the passing-through operation of the grommet 20 can be performed smoothly.

Moreover, since the third penetration hole 16 is provided in the area 12b-1 which is depressed inwardly of the door frame, the door wire harness W/H which is pulled out through the third penetration hole 16 can be pulled out without restricting the space S between the inner panel area 12b of the door frame and a trim cover 13.

Thus, according to the present invention, it is clear from the aforementioned description that since a door wire harness passed from a body side of a vehicle through to a door side, where the door harness is passed through the inside of a door frame by being passed through a penetration hole in the side panel area of the door frame, and then pulled out from a penetration hole in the inner panel area is passed through the inside of a consecutive grommet over the penetration hole of the inside board area of the door frame, the door wire harness can be prevented from water splashing despite the door harness being passed through the inside of the door frame, where it is exposed to water soakage. Accordingly, even if the door harness is pulled out between the inner panel area and a trim cover by being passed through a penetration hole of the inner panel area (beyond to the hole in a sealing screen) from the inside of the door frame, the occurrence of water soakage through the wire harness between the door frame and the trim cover can be prevented.

Also, in the aforementioned construction, only one grommet is required together with the provision of penetration holes only in the side panel area and in the inner panel area of the door frame. Accordingly, cost reduction by decreasing the number of areas and operation will be attained since an installation unit for closing an L-shaped depression which is conventionally provided in the side panel areas over the inside panel area of a hinge installation side is not required. Moreover, the aforementioned structure can be commonly be used for both left and right doors. In addition to the improvement of appearance, the present invention can prevent water soakage through a weather strip because the weather strip is not penetrated by this structure.

The present disclosure relates to subject matter contained in priority Japanese Application No. HEI 11-096401, filed on Apr. 2, 1999, which is herein expressly incorporated by reference in its entirety.

What is claimed:

1. A cable system for a door wire harness of a vehicle, said cable system comprising:

a door wire harness provided from a body side of a vehicle over a door side and reaching to an inside area of a door frame by passing through a first penetration hole provided in a body of the vehicle to a second penetration hole provided in a side panel area of a hinge installation area of the door frame, the door harness being pulled out between the door frame and a trim cover by passing through a third penetration hole provided in an inner panel area of the door frame;

the area of the door harness extending from said first penetration hole to said third penetration hole and passes through the inside of consecutive grommets; and joint areas provided in said grommets are connected with said first penetration hole, said second penetration hole, and said third penetration hole, respectively.

2. The cable system for a door harness according to claim 1, wherein a relationship between a diameter of said first penetration hole provided in the body of the vehicle, a diameter of said second penetration hole provided in an end of a hinge installation area of the door frame and a diameter of said third penetration hole provided in the inside of the door frame is defined such that said first penetration hole is smaller than said second penetration hole which is smaller than said third penetration hole, while a relationship of a height position is set such that the first penetration hole is higher than the second penetration hole which is lower than the third penetration hole.

3. The cable system for the door harness according to claim 1, wherein a guide panel is provided in the door frame to extend toward said third penetration hole from said second penetration hole.

4. The cable system for the door harness according to claim 1, wherein an area provided with said third penetration hole is inclined toward said second penetration hole, and the area is depressed toward the internal side of the door frame.

5. The grommet used for the structure of cable system for the door harness according to claim 1, wherein:

said grommet is configured to have three joint areas, said joint areas being consecutively connected with a small diameter tube for wire harness penetration between every other joint area;

a first large diameter area consecutively provided with a small diameter cylinder at one end which is securable by tape-winding to the door harness, said first joint area connectable to the periphery of said first penetration hole is provided in the perimeter of said first large diameter area, a small diameter cylindrical bellows is connected to one end of said first wide diameter area;

a second large diameter area provided at the other end of the cylindrical bellows, the second joint area connectable to the periphery of said second penetration hole provided in the perimeter of a second large diameter area, and one of a consecutive small diameter cylindrical bellows and an L-shaped tube is connected to said second large diameter area; and a third large diameter area provided at one end said one of said bellows and said tube, and said third joint area connectable to the periphery of said third penetration hole is provided in the perimeter of said third large diameter area.

6. The grommet according to claim 1, further comprising an inner resin member installed in each joint area of said grommet.

7. A cable system for a door wire harness of a vehicle, the vehicle having a body with a door, said cable system comprising:

a first aperture in a portion of the body adjacent a frame of the door;

a second aperture in a side panel of a frame of the door;

a third aperture in an inner panel of the door; and an elongated grommet having spaced apart first, second, and third joint areas sized to fit securely in a respective one of said first, second and third apertures to provide a waterproof connection.

8. The cable system for a door wire harness according to claim 7, wherein said first, second, and third apertures and said first, second and third joint areas are configured such that said first aperture and said first joint area are smaller than said second aperture and said second joint area, and said second aperture and said second joint area are smaller than said third aperture and said third joint area.

9. The cable system for a door wire harness according to claim 7, wherein said first aperture is positioned at a height above said second aperture, and said third aperture is positioned at a height above said second aperture.

10. The cable system for a door wire harness according to claim 7, further comprising a guide panel provided within the door frame, said guide panel extending from adjacent said second aperture toward said third aperture to guide insertion of said grommet between said third aperture and said second aperture during installation.

11. The cable system for a door wire harness according to claim 7, wherein said third aperture is provided within a depression in the inner panel, said depression extending toward an interior of the door.

12. The cable system for a door wire harness according to claim 11, wherein said depression is inclined toward said second aperture to enable easy insertion of said grommet from said third aperture toward said second aperture.

13. The cable system for a door wire harness according to claim 7, further comprising an inner resin member installed in each of said first, second and third joint areas and engagable with a respective one of said first, second and third apertures.

14. A grommet for a door wire harness, said grommet comprising:
- a first joint area having a first size;
- a second joint area having a second size;
- a third joint area having a third size;
- a first generally tubular member interconnecting said first and second joint areas;
- a second generally tubular member interconnecting said second and third joint areas; and
- wherein said first size is smaller than said second size, and said second size is smaller than said third size, whereby said grommet is insertable in first, second, and third consecutively arrayed installation apertures having sizes corresponding to said first, second, and third sizes, respectively.

15. The grommet for a door wire harness according to claim 14, wherein said first, second, and third joint areas are configured as generally circular members, and said first, second, and third sizes are first, second, and third diameters of said circular members.

16. The grommet for a door wire harness according to claim 14, wherein at least one of said first and second tubular members is formed as a small diameter bellows.

17. The grommet for a door wire harness according to claim 16, wherein both said first and second tubular members are formed as small diameter bellows.

18. The grommet for a door wire harness according to claim 16, wherein the other of said first and second tubular members is configured as an L-shaped tubular member.

19. The grommet for a door wire harness according to claim 14, further comprising an inner resin member installed in each joint area of said grommet.

20. The grommet for a door wire harness according to claim 14, further comprising a generally tubular connecting portion connected to said first joint area on a side opposite said first tubular portion, whereby said grommet is securable to the door wire harness by taping.

* * * * *